(12) United States Patent
Zimmer

(10) Patent No.: US 7,777,941 B2
(45) Date of Patent: Aug. 17, 2010

(54) GREENOUGH-TYPE STEREOMICROSCOPE

(75) Inventor: Klaus-Peter Zimmer, Heerbrugg (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 329 days.

(21) Appl. No.: 11/467,447

(22) Filed: Aug. 25, 2006

(65) Prior Publication Data

US 2007/0047072 A1    Mar. 1, 2007

(30) Foreign Application Priority Data

Aug. 26, 2005    (DE) ...................... 10 2005 040 475
Aug. 7, 2006    (DE) ...................... 10 2006 036 768

(51) Int. Cl.
*G02B 21/22*    (2006.01)

(52) U.S. Cl. ...................... 359/378; 359/368; 359/376; 359/431

(58) Field of Classification Search ................ 359/376, 359/378, 368, 431
See application file for complete search history.

(56) References Cited

U.S. PATENT DOCUMENTS

| | | | |
|---|---|---|---|
| 3,655,259 A | 4/1972 | Miyauchi et al. | |
| 3,909,106 A | 9/1975 | Buhler | |
| 4,341,435 A | 7/1982 | Lang et al. | |
| 4,447,717 A | 5/1984 | Nohda et al. | |
| 4,492,441 A | 1/1985 | Hopkins et al. | |
| 4,518,231 A | 5/1985 | Muchel et al. | |
| 4,605,287 A | 8/1986 | Lang et al. | |
| 4,697,893 A | 10/1987 | Fehr et al. | |
| 4,717,246 A * | 1/1988 | Fehr et al. ................ 359/377 |
| 4,786,154 A | 11/1988 | Fantone et al. | |
| 4,862,873 A | 9/1989 | Yajima et al. | |
| 4,989,078 A | 1/1991 | Paxton | |
| 5,009,487 A | 4/1991 | Reiner et al. | |
| 5,603,687 A * | 2/1997 | Hori et al. .................... 600/166 |
| 6,546,208 B1 * | 4/2003 | Costales ...................... 396/324 |
| 6,563,113 B1 * | 5/2003 | Amann et al. ............... 250/309 |
| 6,614,595 B2 | 9/2003 | Igarashi et al. | |
| 6,661,572 B2 | 12/2003 | Spink et al. | |

(Continued)

FOREIGN PATENT DOCUMENTS

| | | |
|---|---|---|
| CH | 500500 | 12/1970 |
| DE | 10222041 | 12/2003 |
| DE | 102 25 192 | 8/2004 |
| DE | 102004006066 | 8/2005 |
| EP | 1010030 | 6/2000 |
| EP | 1235094 | 8/2002 |
| WO | WO-9913370 | 3/1999 |

OTHER PUBLICATIONS

Zimmer, K-P., "Optical Designs for Stereomicroscopes", in *International Optical Design Conference 1998*, Proceedings of SPIE, vol. 3482, pp. 690-697 (1998).

(Continued)

*Primary Examiner*—Joshua L Pritchett
(74) *Attorney, Agent, or Firm*—Leydig, Voit & Mayer, Ltd.

(57) ABSTRACT

A stereomicroscope of the Greenough type includes a first monocular microscope and a second monocular microscope, which define a first beam path and a second beam path, respectively, wherein the first and second microscopes are arranged at a convergence angle to one another and comprise magnification systems for producing equal magnifications which can be varied synchronously with one another. At least one optical element in the first microscope has a different optically effective diameter compared to at least one corresponding optical element in the second microscope.

19 Claims, 10 Drawing Sheets

U.S. PATENT DOCUMENTS

| | | | |
|---|---|---|---|
| 6,816,321 | B2 | 11/2004 | Zimmer et al. |
| 2003/0210470 | A1 | 11/2003 | Zimmer et al. |
| 2003/0227672 | A1* | 12/2003 | Zimmer et al. .............. 359/376 |
| 2004/0085628 | A1* | 5/2004 | Kawasaki et al. ........... 359/385 |
| 2004/0091259 | A1* | 5/2004 | Hanzawa .................... 396/534 |
| 2004/0217259 | A1* | 11/2004 | Yoneyama et al. .......... 250/205 |
| 2005/0168809 | A1 | 8/2005 | Moller et al. |
| 2007/0047072 | A1 | 3/2007 | Zimmer |
| 2008/0030848 | A1 | 2/2008 | Zimmer |

OTHER PUBLICATIONS

Brochure "OMI VISU 200 am Bodenstativ S8 Ophathalomologie unter neuen Aspekten" [OMI VISU 200 on the S8 Floor Stand Ophthalmology From a New Perspective], Operationsmikroskope von Carl Zeiss, pp. 1-4.

Brochure "SteREO Die neue Groesse" [SteREO Expanding the Boundaries], Mikroskopie von Carl Zeiss, pp. 1-4.

W. Klein, "Einige optische Grundlagen zu Vario-Systemen", Jahrbuch fuer Optik und Feinmechanik [Yearbook for Optics and Rescision Mechanics], 1972, Pegasus, Wetzlar, Germany, p. 63, section 8.3.3.

Co-pending U.S. Appl. No. 12/332,903, filed Dec. 11, 2008, entitled "Stereomicroscope".

Co-pending U.S. Appl. No. 11/467,815, filed Aug. 28, 2006, entitled "Stereomicroscope".

Co-pending U.S. Appl. No. 11/467,455, filed Nov. 27, 2006, entitled "Stereomicroscope".

Notice of Allowance mailed Jan. 30, 2009 in co-pending U.S. Appl. No. 11/467,455.

Non-Final Office Action mailed Feb. 13, 2009 in co-pending U.S. Appl. No. 11/467,815.

* cited by examiner

GREENOUGH-TYPE STEREOMICROSCOPE

Priority is claimed to German Patent Application No. DE 10 2005 040 475.8, filed on Aug. 26, 2005 and German Patent Application No. DE 20 2006 036 786.5, filed on Aug. 7, 2006, both of which are incorporated by reference herein.

The present invention concerns a stereomicroscope according to the Greenough type, and in particular, to a Greenough-type stereomicroscope including a first monocular microscope and a second monocular microscope, which define a first beam path and a second beam path, respectively.

BACKGROUND

Stereomicroscopes are used on the one hand to manipulate objects under visual observation and on the other to make fine object details visible. The object manipulation preferably takes place under low magnification and requires good 3D reproduction. For detail recognition rapid switching to high magnifications with high resolution is desired without any change of instrument.

Greenough stereomicroscopes are described in many places in the literature, c.f. also "Optical Designs for Stereomicroscopes", K-P. Zimmer, in International Optical Design Conference 1998, Proceedings of SPIE, Vol. 3482, pages 690-697 (1998). As stated therein, these microscopes consist of two monocular microscopes inclined towards one another. According to the prior art these two microscopes are constructed symmetrically with respect to a perpendicular on the plane of the object. Greenough stereomicroscopes provide two views of the object from different observation angles each of which is delivered to one eye, thereby providing a three-dimensional image impression. If the angle between the two directions of observation is too great, the lateral edges of the object appear out of focus.

The angle between the two microscopes, referred to as the convergence angle, is typically in the range from 10° to 12°. Since the optical axes of the two microscopes meet the object at an oblique angle, a large convergence angle is detrimental to the in-focus reproduction of the edges of the object and makes merging of the two partial images into a three-dimensional image difficult. The numerical aperture of the individual microscopes is upwardly limited by the convergence semi-angle in the conventional construction, as the lenses that define the opening cone cannot penetrate one another. The numerical aperture can in fact be increased by attachment lenses, but only if the working distance is considerably reduced. At the same time the observation angle at the object end is increased, with the negative consequences described above for the reproduction of the edges of the object.

From U.S. Pat. No. 5,603,687 an asymmetrical stereo-optical endoscope is known in which two systems of objectives with different diameters of the entry pupil are arranged parallel and side by side. The two objectives generate images of the object on a sensor surface by means of light guides. From these CCD sensors, for example, the image data are conveyed to a monitor after digital processing, i.e. they can be perceived three-dimensionally with a stereomonitor, for example. It is stated that in spite of the different diameters of the two endoscopic channels the observer perceives a stereoscopic image with a resolution and a brightness as determined by the larger-diameter channel. The second channel with a smaller diameter would serve primarily to produce a three-dimensional view.

The situation in a Greenough-type stereomicroscope of the construction described above is fundamentally different from that in an endoscope according to U.S. Pat. No. 5,603,687. First of all, the object is generally (at least additionally) viewed directly with the eyes without any digital processing beforehand. Such digital processing is or may be used if in addition documentation is to be carried out using attached cameras. Furthermore, the stereochannels or microscopes are not parallel to one another but are arranged at the specified convergence angle to one another. It is not apparent from the above-mentioned US specification how an object can be viewed visually directly with the arrangement disclosed therein. Furthermore, the imaging on one sensor surface (fixed focus) restricts the depth of focus of the image as the accommodation ability of the eyes is eliminated.

The magnification of an endoscope is dependent on the distance of the object. At high magnifications the distance of the object is generally short. In this case the area of overlap between the visual fields of the two adjacent objectives is small. Therefore in this case stereoscopic viewing, which is possible only in the area of overlap, is restricted. At low magnifications, on the other hand, the overlap is great but the numerical aperture is small, resulting in a high depth of focus. This means that the imaging quality of 3-D objects decreases only slowly with the distance from the focussing plane. This fact favours the merging of the two partial images into one three-dimensional image, particularly when the depth of the object is less than the depth of focus.

An essential component of a stereomicroscope of the kind described is an objective changer for the discrete adjustment of magnification or zoom systems (also known as objectives in the form of Vario-systems) for continuously selecting the magnification, in the case of the synchronous adjustment of magnification in the two stereochannels. Magnification systems of this kind are not common in endoscopy. Therefore, the US specification mentioned above does not discuss any variation in the scale of the imaging.

For stereoscopic observation the depth of focus is important. In contrast to the stereoendoscope described above, high-powered stereomicroscopes of the Greenough-type advantageously make use of the accommodation ability of the eyes. The magnification is varied without changing the focussing of the device. Throughout the entire range of magnifications there is no difference in the blanking of the object between the right- and left-hand partial images. The numerical aperture and hence the resolution of the stereomicroscope is matched to the magnification and avoids needless or empty magnification. At high magnifications in arrangements of this kind the depth of focus is very small, in many cases less than the depth of the object. The imaging quality of 3-D objects therefore decreases sharply with the distance from the focussing plane. It cannot therefore be assumed that the fusion of the partial images into one three-dimensional image, observed in a stereoendoscope with typically low magnification and high depth of focus, can be transferred to the circumstances which prevail in a high-powered microscope, particularly at high magnifications, when the stereoscopic channels deliver images of different resolution and depth of focus as a result of different apertures.

Another aspect which cannot be ignored is that of the brightness of the image, which varies in the above-mentioned US specification on account of the different entry pupil diameters of the endoscopic channels. Here, digital image processing has the advantage that both partial images can be displayed on the monitor with equal brightness after suitable correction. Such correction is not possible with direct visual observation such as occurs in stereomicroscopes.

From U.S. Pat. No. 3,655,259 a somatic microscope is known which is to be used as an endoscope. This microscope is designed as a stereomicroscope of the Greenough-type.

The two stereochannels are at a given acceptance angle to one another and each have their own objectives, which are constructed in this case as mini lenses, rod lenses or as the end sections of a glass fibre. The problem underlying the somatic microscope in this specification is based on the fact that when two objectives are used they cannot be arranged as close together as is desired, as the objective used is a lens combination and it is impossible to use a single objective lens because of the increasing spherical aberrations, particularly when work is to be done under high magnification. The aim in the above-mentioned specification is therefore to find an arrangement which allows a narrow endoscope diameter while achieving a high magnification.

Another stereoendoscope is known from U.S. Pat. No. 4,862,873, which has two channels arranged parallel to one another, one of the channels being used for illumination while the other is used for observation. To produce a stereoscopic image impression the two channels are switched 30 times per second, for example, using a motor driven prism.

SUMMARY OF THE INVENTION

An object of the invention is to provide a Greenough-style stereomicroscope which has improved detail recognition compared to Greenough stereomicroscopes of conventional design without this leading to an increase in the convergence angle and hence the construction volume as well.

The present invention provides a stereomicroscope of the Greenough type that includes a first monocular microscope and a second monocular microscope, which define a first beam path or a second beam path, wherein the first and second microscopes are arranged at a convergence angle to one another and comprise magnification systems for producing equal magnifications which can be varied synchronously with one another, characterised in that at least one optical element in the first microscope has a different optically effective diameter compared to at least one corresponding optical element in the second microscope.

It is advantageous if at least one optical element in the first beam path of the first microscope has a different optically effective diameter compared to at least one corresponding optical element in the second beam path of the second microscope. The term "optically effective diameter" means the diameter which describes the pencil of rays contributing to the image generation when they hit an optical element which they penetrate.

It is now possible to provide stereomicroscopes according to the invention which on the one hand have great depth of focus as a result of a small numerical aperture at low magnifications and permit good 3-D representation and on the other hand have a high aperture at high magnifications and therefore provide high resolution without producing needless or empty magnifications (increase in magnification without increased recognition of details, i.e. with the same resolution). Furthermore, the detail recognition can be improved compared with stereomicroscopes of conventional construction without increasing the angle of convergence and hence the construction volume.

The optical elements of the first microscope and/or of the second microscope are lens elements or diaphragms. For at least one magnification setting or one zoom range—preferably at high magnifications—of the first and second microscopes the numerical aperture of the first microscope is at least 10%, particularly 10% to 50%, greater than that of the second microscope. At the maximum magnification setting of the first microscope and second microscope the numerical aperture of the first microscope is advantageously more than 10%, particularly 10% to 50%, greater than that of the second microscope.

The numerical aperture of the first microscope can thus be made greater than the sine of the convergence semi-angle while keeping the convergence angle unchanged if the numerical aperture of the second microscope is chosen to be correspondingly smaller than the sine of the convergence semi-angle. Thus by means of the invention the limit of the convergence semi-angle for the numerical aperture of a microscope which used to be the case can now be done away with.

In a Greenough-type stereomicroscope according to the invention there are various possible ways of arranging the two microscopes or the optical axes fixed by them relative to a perpendicular to the plane of the object. On the one hand it is possible to have an arrangement in which the perpendicular symmetrically divides the convergence angle, i.e. halves it ("symmetrical arrangement"), while on the other hand the perpendicular may divide the convergence angle asymmetrically ("asymmetric arrangement").

It is particularly advantageous if an optical axis of the first microscope and an optical axis of the second microscope are arranged symmetrically to a perpendicular in an object plane. This symmetrical arrangement has the advantages that the exit pupils are at the same height above the object and hence the user can look without bending his head to the side, thus avoiding an unergonomic position of the head. In this arrangement the channel with the greater depth of focus also improves the perceived depth of focus overall.

When increasing the diameter of a microscope it may initially seem obvious to arrange this microscope at a smaller angle to the perpendicular, for reasons of space, and to arrange the other microscope at a correspondingly greater angle to the perpendicular if the convergence angle is to remain unchanged. The smaller angle to the perpendicular counteracts the lack of definition of the edges in the microscope with the higher aperture and hence a lower depth of focus, whereas the larger angle for the other microscope is acceptable because of its greater depth of focus. However, the resulting asymmetric arrangement has disadvantages of its own because of the resulting unergonomic viewing position.

Similarly it may seem obvious to arrange the large-diameter microscope at a greater angle to the perpendicular and to move the other microscope correspondingly closer to the perpendicular, so that the particular sets of lenses of the two microscopes facing the object (almost) touch one another at the perpendicular. This similarly asymmetric arrangement is disadvantageous as the greater angle from the perpendicular favours the loss of definition around the edges in the microscope with the higher aperture. Furthermore, the reduced depth of focus of this microscope caused by the larger angle is disadvantageous. Finally, the disadvantage of an unergonomic viewing position still remains.

However, it may be advantageous to mount the unit comprising the two microscopes with a fixed convergence angle such that the angles between the optical axes of the microscopes and the perpendicular are adjustable. For example, the unit may be tilted such that the microscope with the greater optically effective diameter is at a smaller angle to the perpendicular than the other microscope. This adjustment is advantageous because of the reduced lack of definition at the edges, particularly when the microscope with the greater optically effective diameter is used for documentation purposes.

It is advantageous if at least one filter can be positioned in the beam path of the first microscope with the higher numerical aperture. This results in an adaptation of the brightness between the first and second beam paths. Here the filter may be designed as a filter that is homogeneous over the entire surface. Furthermore, the filter can also be designed as a graduated filter. In this case a change in brightness dependent on the magnification can be compensated by moving a filter. Moving or changing and generally positioning a filter may be carried out manually or by automation, particularly as a function of the magnification selected.

The magnification of the microscopes is adjusted equally and synchronously, advantageously using a zoom system for continuously changing the magnification.

A decoupling device may be arranged in the first beam path of the first microscope with the higher numerical aperture, in order to at least partly direct light from this beam path to a documentation device. For documentation purposes the beam path with the greater numerical aperture and hence resolution is used.

Further advantageous embodiments of the invention can be found in the claims and the embodiments that follow. The features of the invention can be implemented not only in the combination shown here but also in other combinations or on their own without departing from the scope of the invention.

BRIEF DESCRIPTION OF THE DRAWINGS

The subject-matter of the present invention is described in more detail below and shown schematically in the drawings, which show.

DETAILED DESCRIPTION

Figure 1:
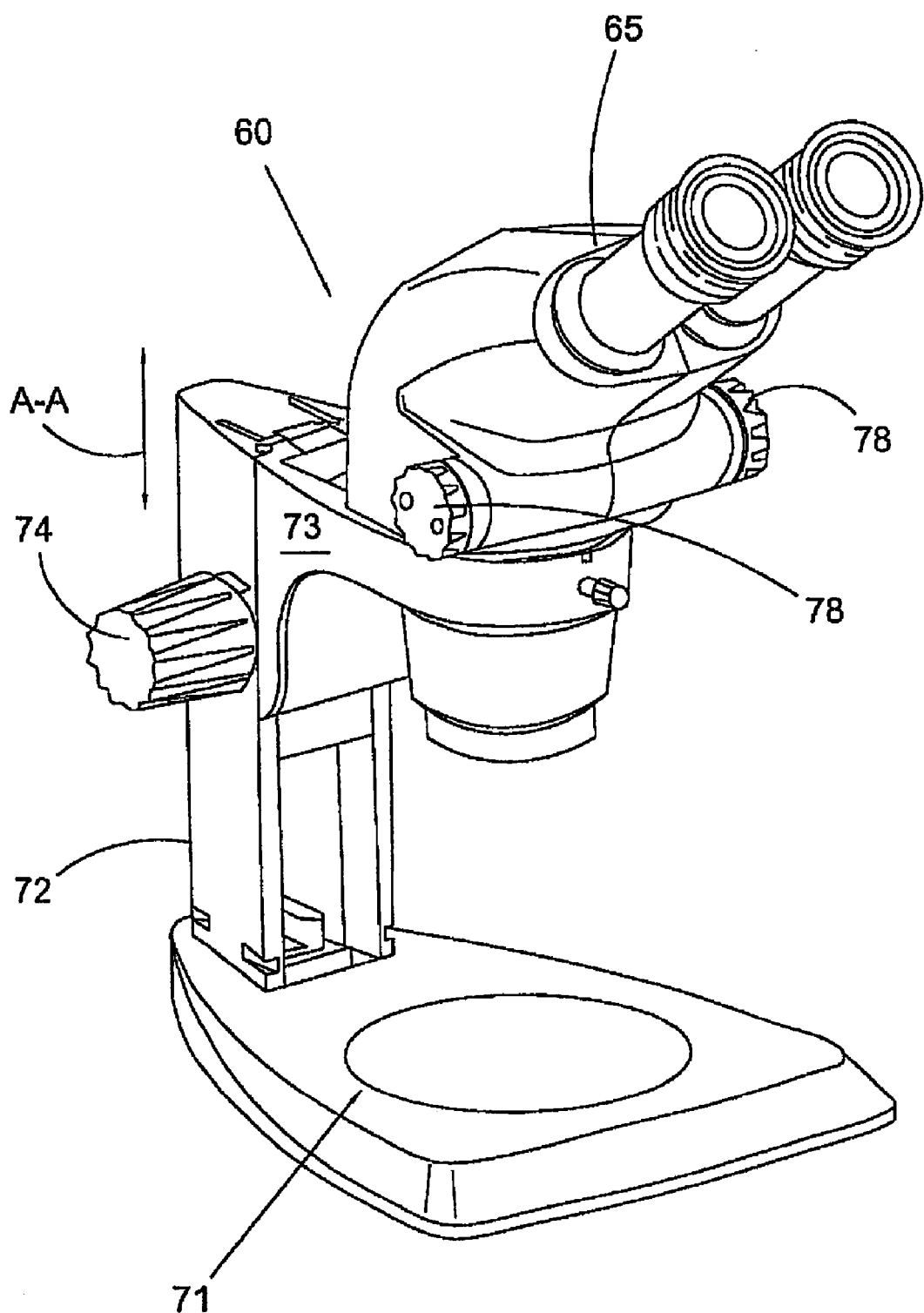
FIG. 1 a perspective view of a Greenough-style stereomicroscope according to the prior art.

FIG. 1 is a perspective view of a Greenough-style stereomicroscope 60 according to the prior art. The stereomicroscope 60 comprises a base 71, to which a focusing column 72 is secured. A focusing arm 73 is movably mounted on the focusing column 72, and can be displaced by means of adjustment elements 74 along the double arrow A-A. The stereomicroscope 60 has a binocular tube 65 and a zoom system (see FIG. 2). The zoom system can be adjusted by adjusting elements 78. Instead of a continuously operating zoom system an objective changer which discretely changes the magnification may be provided.

Figure 2:
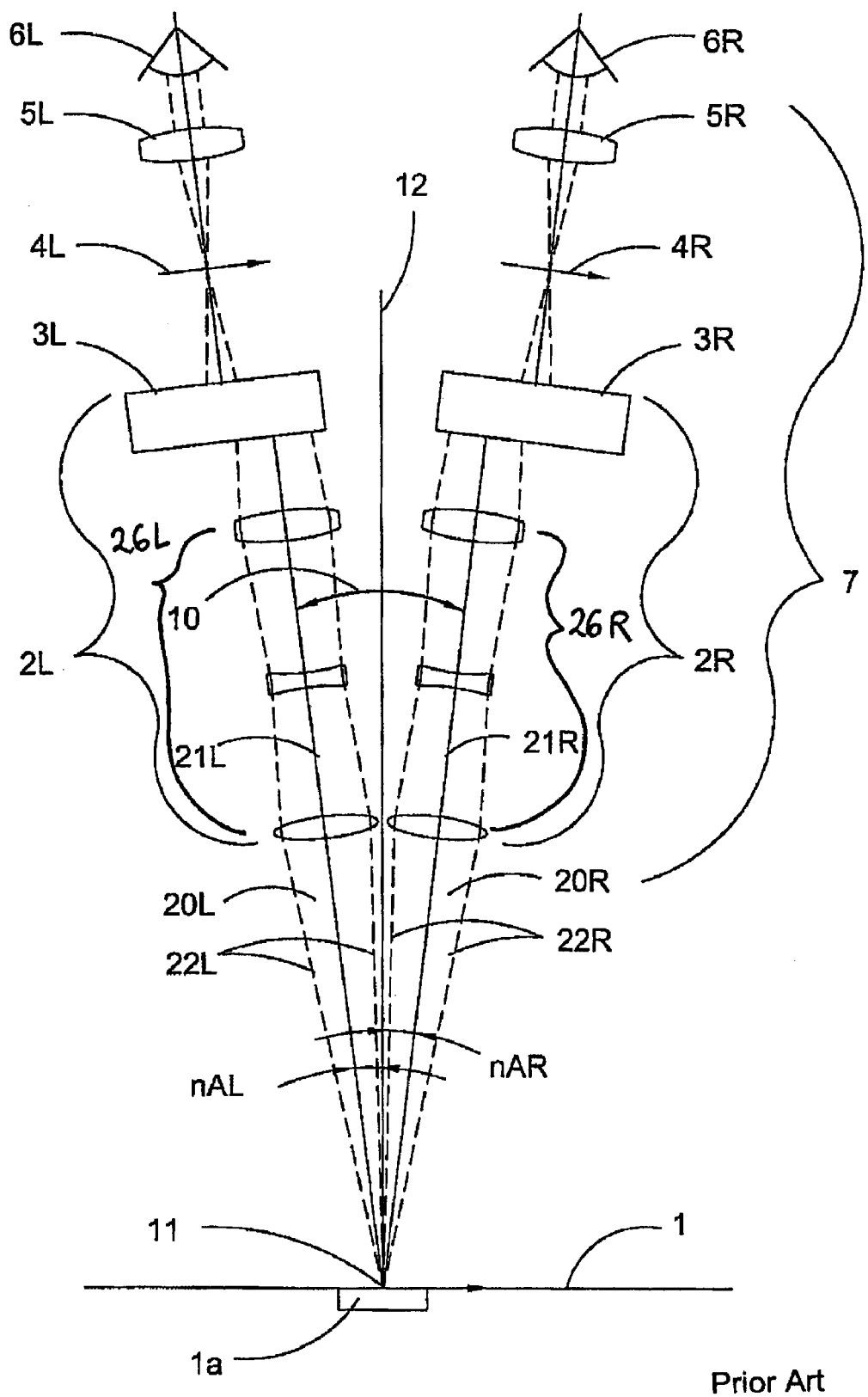
FIG. 2 a schematic diagram of the optical design of a Greenough-style stereomicroscope according to the prior art.

FIG. 2 is a schematic diagram of the optical design of a Greenough-style stereomicroscope 7 according to the prior art. The Greenough-style stereomicroscope 7 is constructed from a first monocular microscope 2R and a second monocular microscope 2L. The two microscopes 2R and 2L are constructed symmetrically in such a way that both microscopes 2R and 2L have the same focal point 11. The focal point 11 is in the object plane 1, in which the object 1a to be investigated is also situated. The perpendicular 12 in the object plane 1 at the focal point 11 represents the axis of symmetry of the Greenough-style stereomicroscope. The first microscope 2R defines a first optical axis 21R. The second microscope defines a second optical axis 21L. The two optical axes 21R and 21L of the two microscopes 2R or 2L enclose an angle 10, the convergence angle, which is preferably between 10° and 12°.

The two microscopes 2R and 2L preferably have zoom systems 26R and 26L, respectively, as magnification systems. Zoom systems 26R, L are shown consisting of two groups with positive refractive power and a group arranged between them with negative refractive power, as disclosed for example on the right-hand side of FIG. 13 in Section 8.8.3 of the article by W Klein, "Einige optische Grundlagen zu Vario-Systemen", in the Jahrbuch für Optik und Feinmechanik 1972, Pegasus, Wetzlar, Page 33-64. This also shows the movements of the zoom groups. In each microscope 2R or 2L a symmetrical inverter system 3R or 3L is provided for image righting. The microscopes 2R or 2L and the inverter systems 3R or 3L generate righted intermediate images 4R or 4L, downstream of which are arranged the eyepieces 5R and 5L, respectively. The user detects the image of the object with his eyes 6R and 6L.

The reproduction by a Greenough-style stereomicroscope 7 of this kind is illustrated by the schematic representation of the marginal beams 22R and 22L of the first beam path 20R and the second beam path 20L which both originate from the focal point 11. The two marginal beams 22R and 22L identify the limits of the two illuminating pencils used by the Greenough-style stereomicroscope 7. Since the two microscopes 2R or 2L are unable to penetrate, the numerical aperture nA of the microscopes 2R or 2L is limited by the convergence semi-angle nAR (=nAL).

A high numerical aperture for a high-powered Greenough-style microscope is likewise indispensable. The resolution is given by:

$$\text{Resolution} = 3000 * nA \, [Lp/mm] \qquad \text{Equation (1)}$$

where nA is the numerical aperture. Lp/mm denotes line pairs per millimetre.

Since the stereomicroscopes will also be used for object manipulation a large depth of field T is important. The depth of field T is given by the following equation:

$$T = \lambda/(2*nA^2) + 0.34 \, \text{mm}/(Vtot*nA) \qquad \text{Equation (2)}$$

where λ=light wavelength of approx. 550E-6 mm and Vtot=microscope magnification including eyepiece magnification.

According to the prior art, the resolution, numerical aperture and depth of field are the same in both beam paths 20R and 20L.

Figure 3:
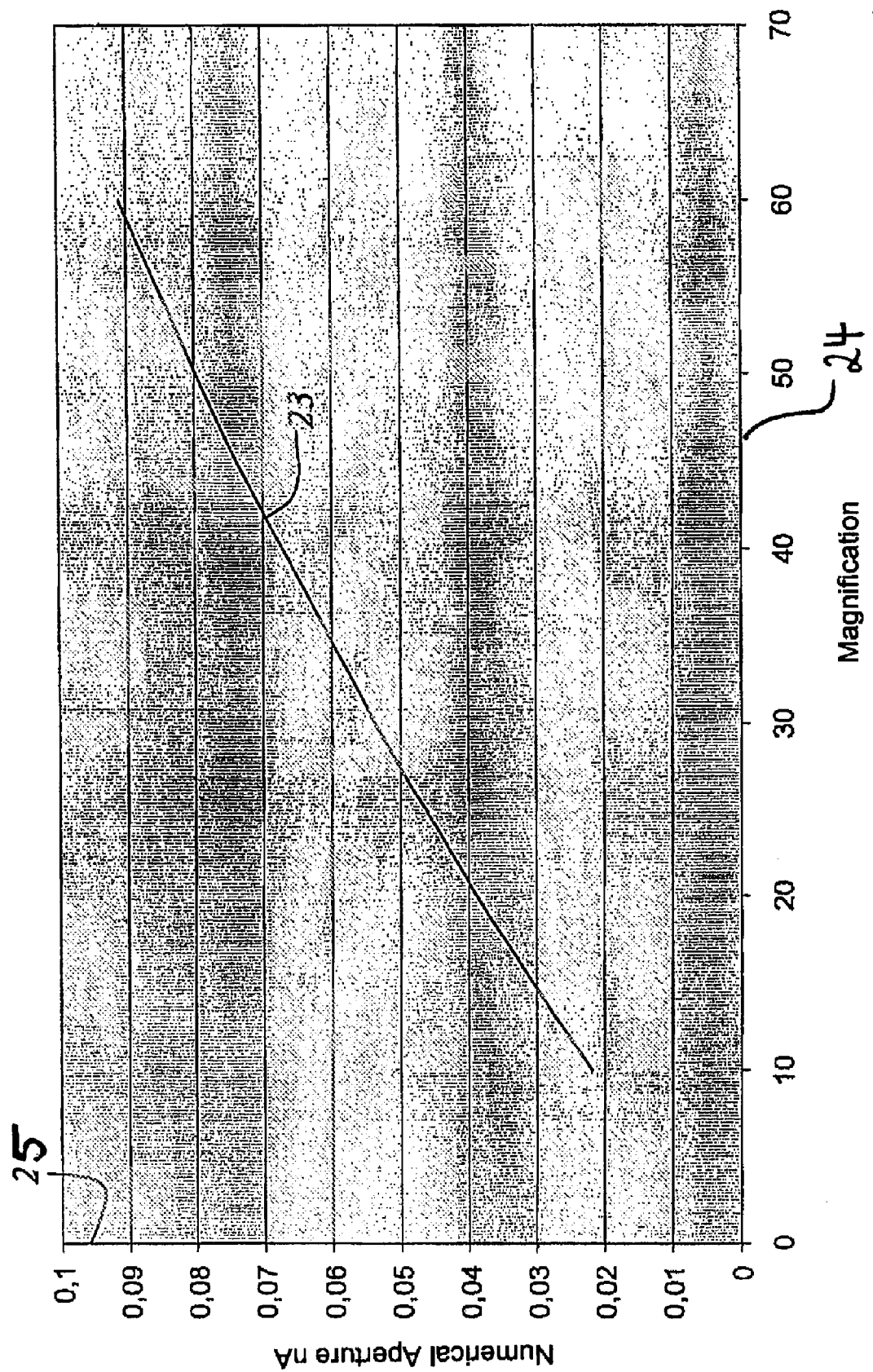
FIG. 3 the progression of the numerical aperture nA for a typical Greenough-style stereomicroscope as a function of the magnification.

In FIG. 3 the curve 23 shows the course of the numerical aperture nA for a typical high power Greenough-style stereomicroscope according to the prior art as a function of the magnification. The magnification is plotted on the x axis 24.

The numerical aperture nA is plotted on they axis 25. This example is based on a convergence angle 10 of 10.5°. As a result the numerical aperture is limited to at most nA=sin (5.25°)=0.0915. The magnification of the microscopes 2R and 2L (i.e. the zoom systems and the eyepieces 5R and 5L) is selected such that the total magnification Vtot varies between 10× and 60× without any needless magnification being generated.

Figure 4:
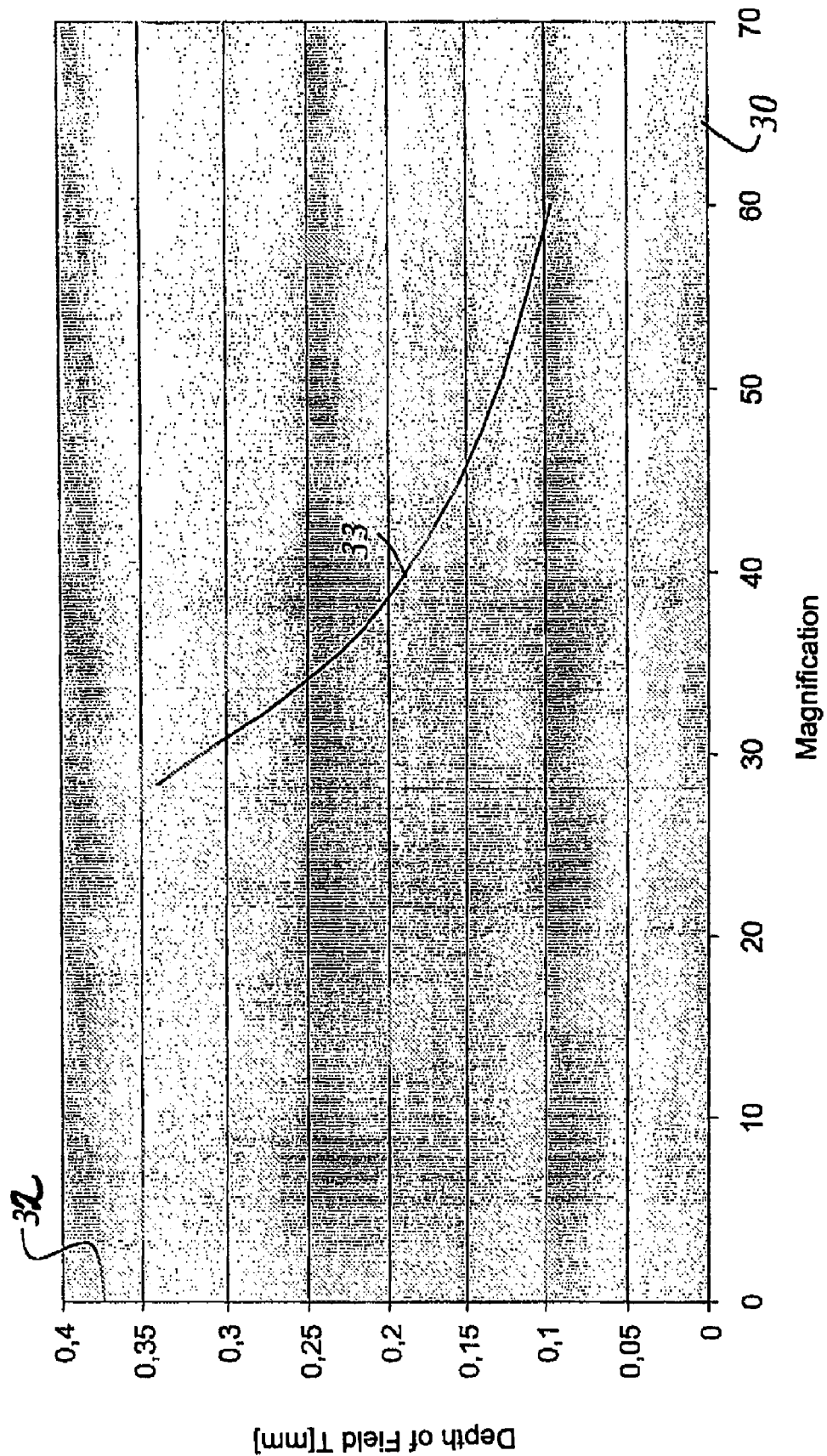
FIG. 4 the progression of the depth of field T of the Greenough-style stereomicroscope described above as a function of the magnification.

FIG. 4 shows the associated progression of the depth of field 33 as a function of the magnification for the high magnifications. The magnification is plotted on the x axis 30. The depth of field T is plotted on the y axis 32. The depth of field 33 reduces as the magnification increases.

Figure 5:
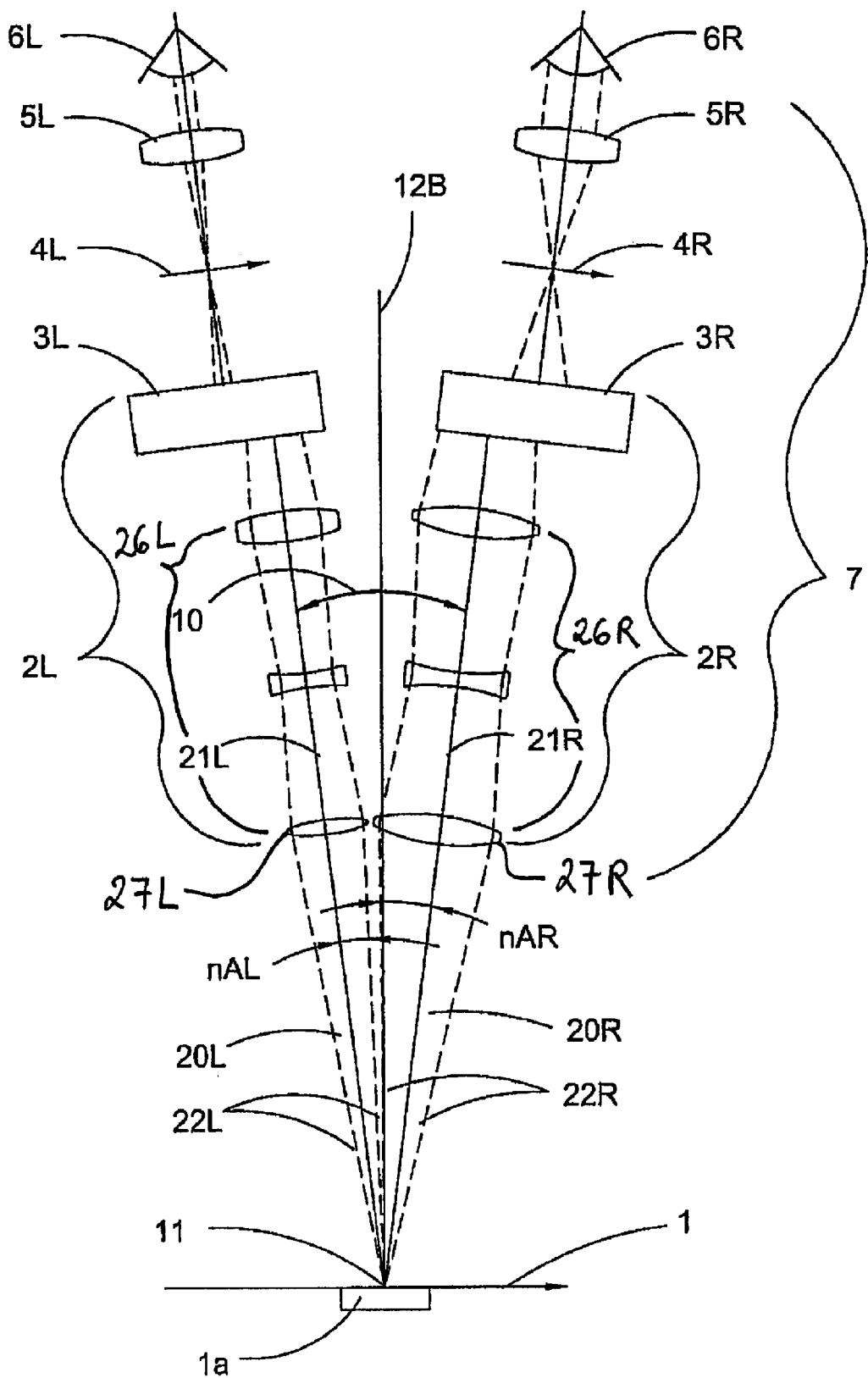
FIG. 5 a schematic view of the optical design of a first embodiment of the invention.

FIG. 5 is a schematic representation of an embodiment of the Greenough-style stereomicroscope 7 according to the invention. The convergence angle 10 is unchanged compared to FIG. 2. The references from FIG. 2 have been used, as the same elements in the two figures are identified by the same references. The Greenough-style stereomicroscope 7 according to the invention likewise comprises a first monocular microscope 2R and second monocular microscope 2L. The two microscopes 2R and 2L are arranged in such a way that the two microscopes 2R and 2L have the same focal point 11. The focal point 11 is located in the object plane 1 in which the object 1a to be investigated is also positioned. The two optical axes 21R and 21L of the two microscopes 2R and 2L in this embodiment are arranged symmetrically to the perpendicular 12B in the object plane 1 at the focal point 11. The first microscope 2R has a different diameter for the first beam path 20R from the diameter of the second beam path 20L of the second microscope 2L. The first and second microscopes 2R and 2L are not identical in construction. FIG. 5 is a schematic representation of the setting of maximum magnification of the zoom systems 26R and 26L of the two microscopes 2R and 2L. It can be seen that the diameter of the first beam path 20R is greater than the diameter of the second beam path 20L. In this example the numerical aperture of the first beam path 20R is greater than the sine of the convergence half-angle 10, as the opening cone of the right-hand microscope includes the perpendicular 12B.

Instead of the zoom systems 26R, L an objective changer (not shown) may also be provided. For example, pairs of objectives for the right- and left-hand microscopes are mounted on a bevel gear the rotation axis of which is the axis of symmetry of the two microscope axes, in this FIG. 5 the axis 12B. The pairs of objectives differ from other pairs in the magnification and the object distance and allow an object to be viewed without refocussing. By rotating the bevel gear different pairs of objectives are brought into the effective position and thus different magnifications are adjusted synchronously for both microscopes.

Figure 6:
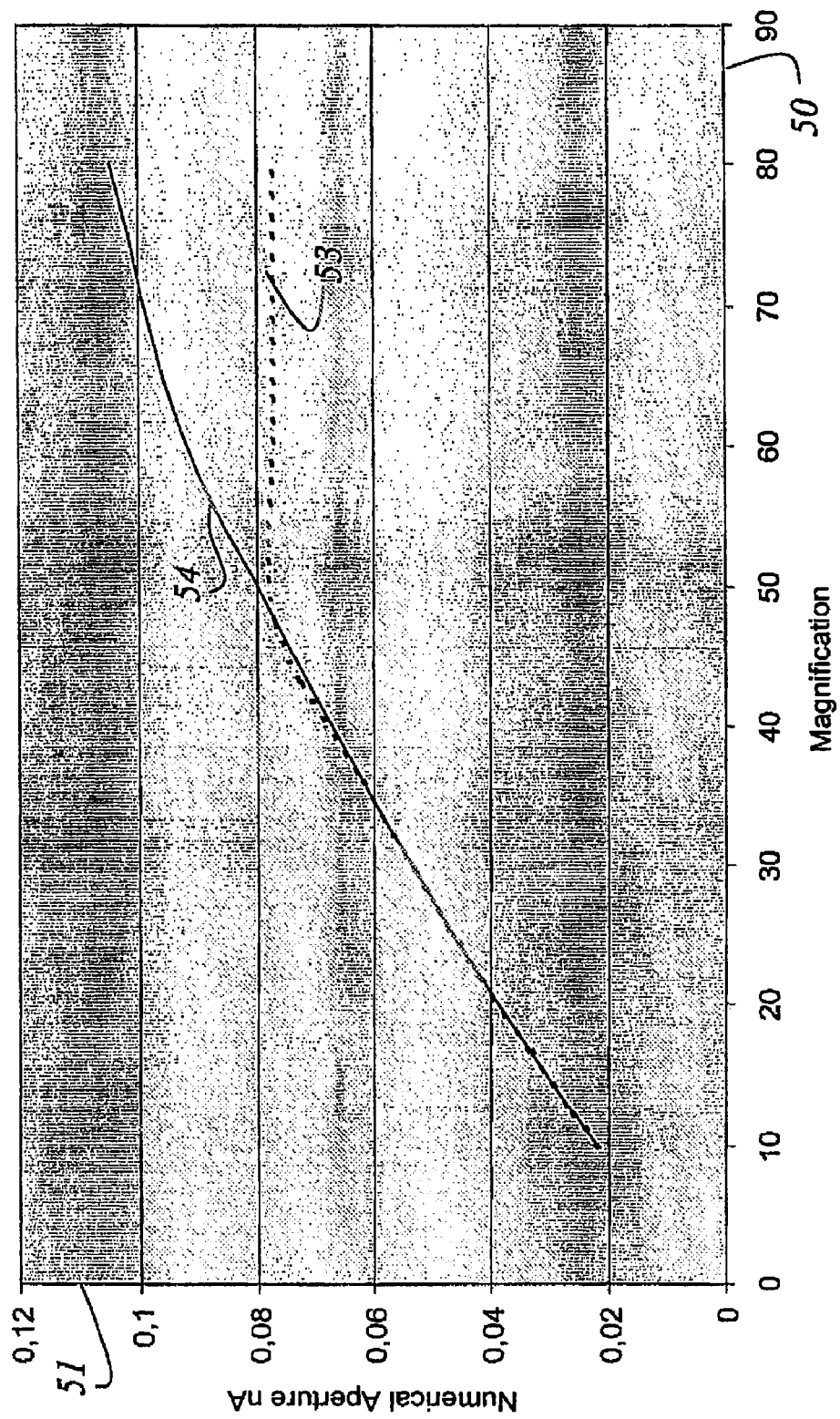
FIG. 6 the progression of the numerical aperture nA as a function of the magnification according to the Greenough-style stereomicroscope according to the invention.
Figure 7:
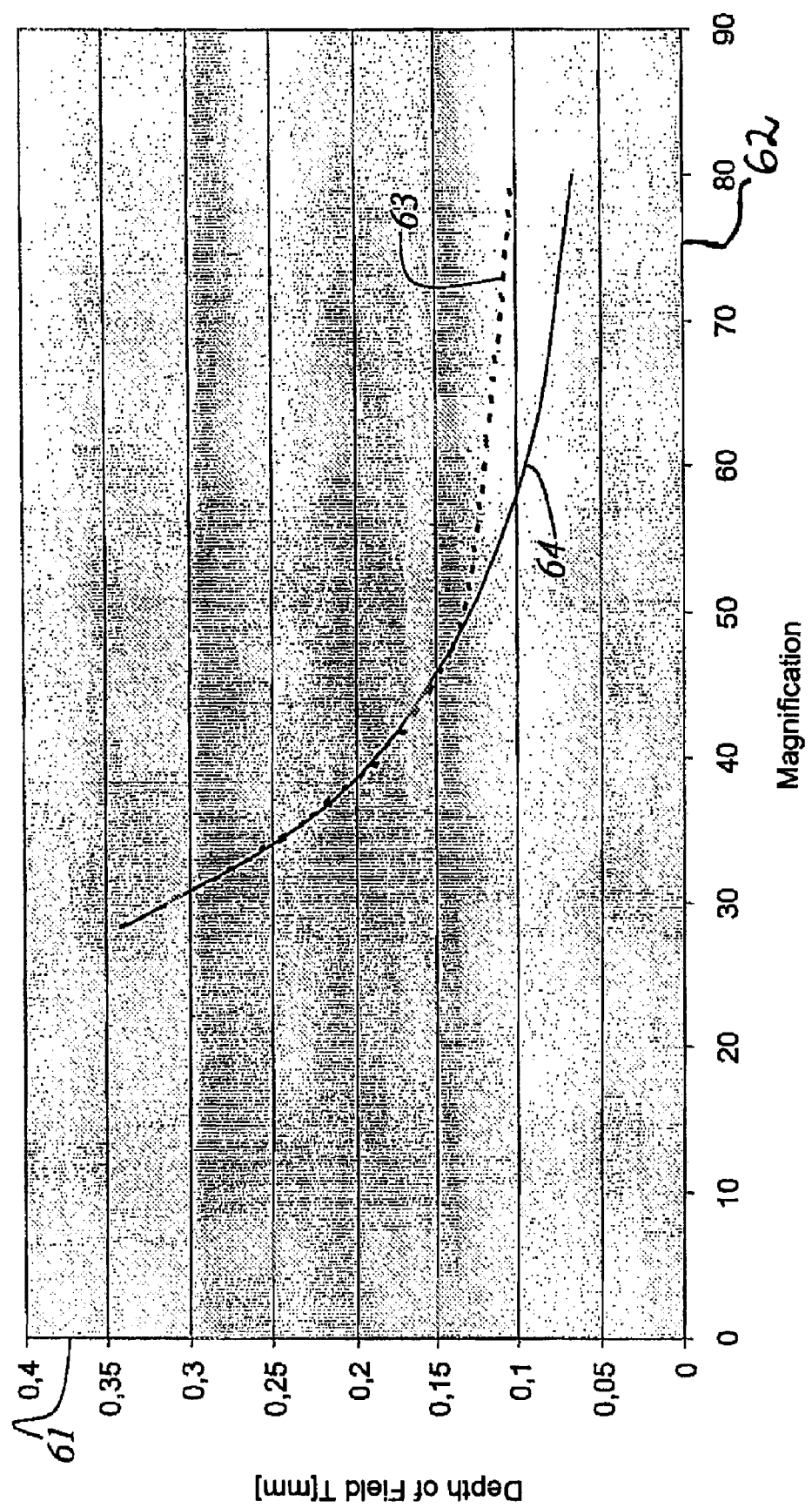
FIG. 7 the progression of the depth of field T as a function of the magnification according to the Greenough-style stereomicroscope according to the invention.

FIGS. 6 and 7, respectively, show the course of the numerical aperture nA and the depth of field T as a function of the magnification for an embodiment with a maximum numerical aperture nA=0.104 (corresponding to 6°) in the first microscope 2R and a maximum nA=0.0768 (corresponding to 4.4°) in the second microscope 2L. In FIG. 6 the numerical aperture nA is plotted on the y axis 51 and the magnification on the x axis 50. In FIG. 7 the depth of field T is plotted on the y axis 61 and the magnification on the x axis 62. The magnification of the zoom systems 26R and 26L (of the first and second microscopes 2R and 2L) and the magnification of the eyepieces 5R and 5L are selected so that the total magnification Vtot varies between 10× and 80×. The continuous line 54 (FIG. 6) is obtained for the first microscope 2R with the large numerical aperture nA, and the broken line 53 is obtained for the second (left) microscope 2L with the smaller numerical aperture nA. Thanks to the higher numerical aperture nA the resolution increases so that a higher final magnification is possible without generating needless magnification. The depth of field at the highest magnification, on the other hand, in spite of a higher final magnification, surprisingly does not get smaller, as is clear from a comparison of the curves 33 in FIGS. 4 and 63 in FIG. 7. For an explanation of this see the following remarks on the evaluation of two partial images with different resolution and depth of field. The continuous line 64 (FIG. 7) is obtained for the first microscope 2R with the large numerical aperture nA, and the broken line 63 is obtained for the second (left-hand) microscope 2L with the smaller numerical aperture nA.

In the embodiment shown in which the optically effective diameters of the microscope 2L of smaller diameter are limited for example by the lens diameter of the lens element 27L, the two microscopes can be made with the same effective diameter over a wide range of low magnifications, and for this reason the stereomicroscope in this setting acts in the same way as a conventional one. Only at high magnifications in which the numerical aperture of the microscope 2R with the larger diameter exceeds the numerical aperture defined by the above-mentioned limiting lens 27L of the microscope 2L with the smaller diameter, are the numerical apertures asymmetrical and the effects described above come into play.

Figure 8:
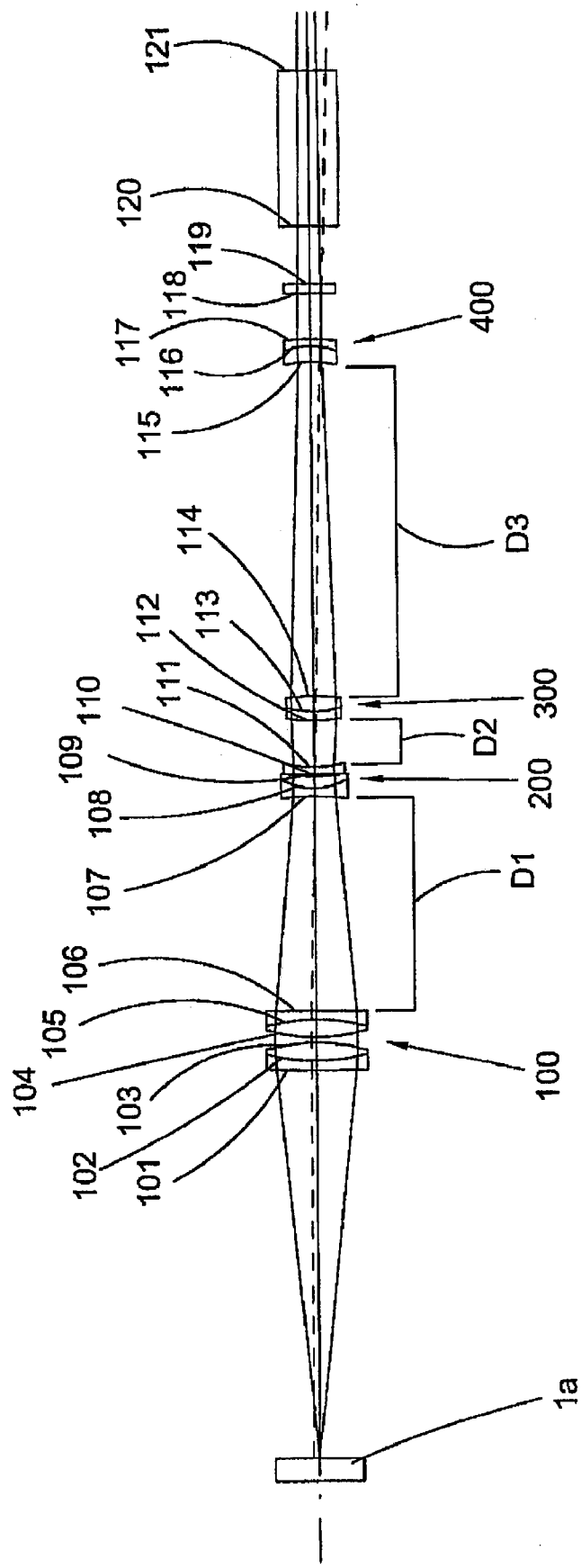
FIG. 8 the beam path of the first zoom system of the first microscope at maximum magnification.
Figure 9:
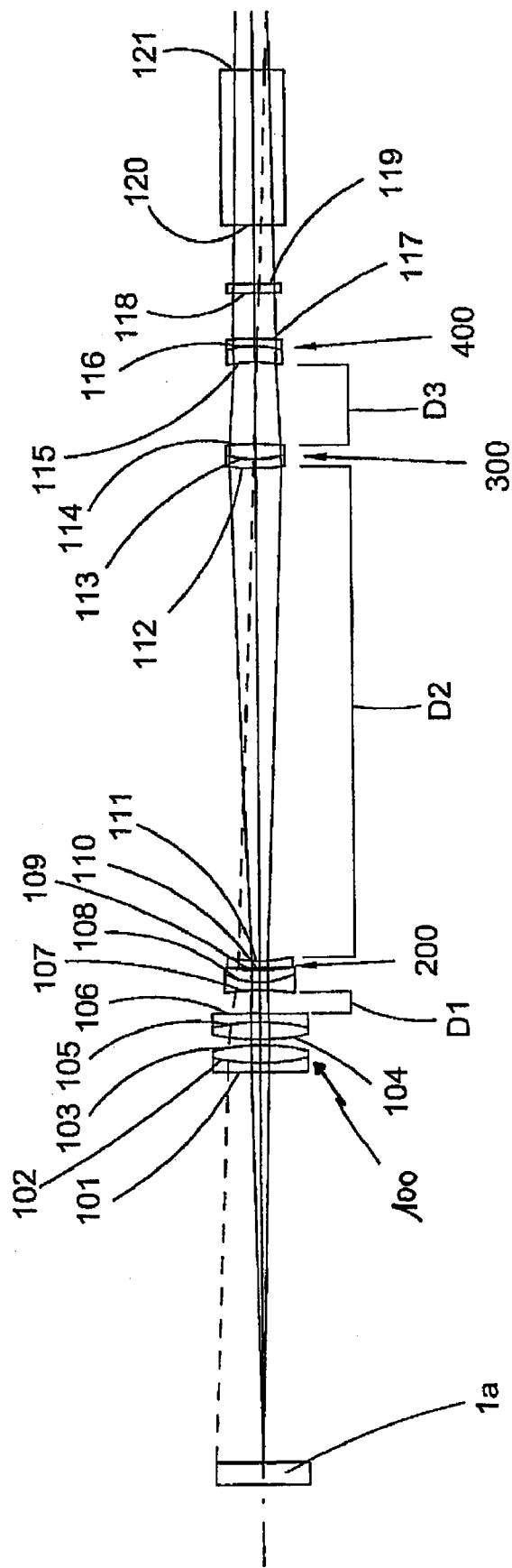
FIG. 9 the beam path of the first zoom system of the first microscope at minimum magnification.
Figure 10:
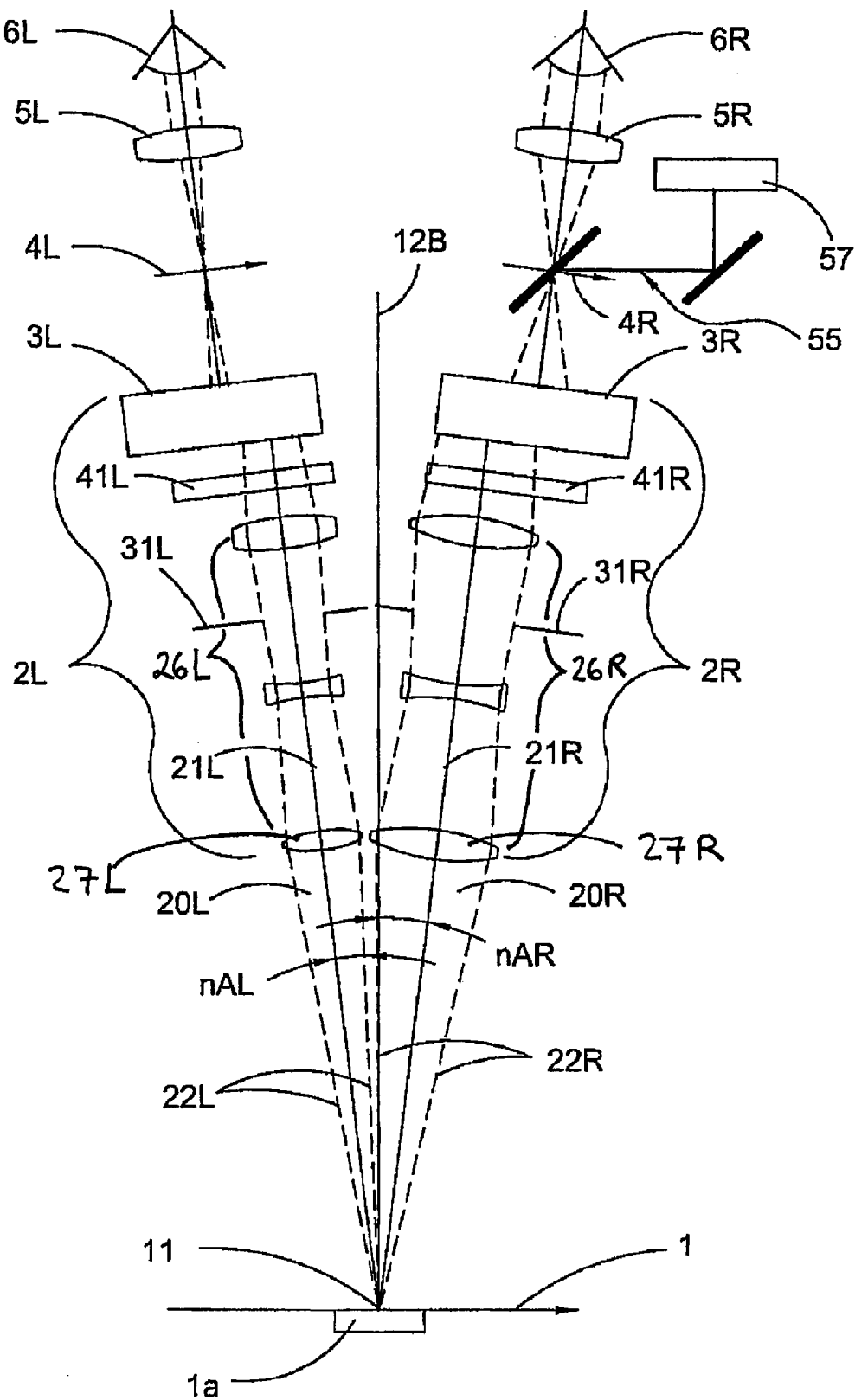
FIG. 10 a schematic view of the optical construction of an embodiment of the invention with further optical elements, which are not disclosed in the illustration of FIG. 5.

Instead of the zoom systems (26R, 26L) shown in FIGS. 5 and 10, which may also be referred to as objectives constructed as Vario-systems, the zoom systems shown in FIGS. 8 and 9 may also be used. The data relating to these zoom systems are listed in Table 1. As is apparent from FIGS. 8 and 9, each zoom system has four sets of lenses 100, 200, 300 and 400, each set of lenses consisting of an arrangement of lenses with associated surface numbers (see Table 1). The surface numbers 101 to 106 belong to the first set of lenses, numbers 107 to 111 to the second set of lenses, numbers 112 to 114 to the third and numbers 115 to 117 to the fourth set of lenses. The distance of the object plane 1 to the surface 101 is 85.2 mm. Surfaces 118 and 119 represent a filter element for adaptation of the image brightness at various numerical apertures. The surfaces 120 and 121 describe a prism which together with mirrors in the inversion system is used for righting the image.

TABLE 1

| Surface number | Radius [mm] | Distance [mm] | $n_d$ | $V_d$ | øRight [mm] | øLeft [mm] |
|---|---|---|---|---|---|---|
| 101 | 546.64 | 2.0 | 1.61336 | 44.5 | 18.0 | 13.2 |
| 102 | 44.05 | 3.9 | 1.49700 | 81.5 | 18.35 | 13.4 |
| 103 | −41.91 | 1.25 | | | 18.65 | 13.7 |
| 104 | 41.91 | 3.9 | 1.49700 | 81.5 | 18.7 | 13.7 |
| 105 | −44.05 | 2.0 | 1.61336 | 44.5 | 18.4 | 13.4 |
| 106 | −546.64 | D1 46.95 ÷ 5.0 | | | 18.1 | 13.2 |
| 107 | −55.40 | 1.75 | 1.53172 | 48.8 | 13.4 | 10.5 |
| 108 | −15.73 | 2.6 | 1.75513 | 27.4 | 12.85 | 10.2 |
| 109 | 41.57 | 0.511 | | | 12.4 | 9.8 |
| 110 | Flat | 1.5 | 1.48749 | 70.4 | 12.4 | 9.8 |
| 111 | 28.58 | D2 10.19 ÷ 107.26 | | | 12.1 | 9.6 |
| 112 | 46.66 | 2.0 | 1.72342 | 37.9 | 11.0 | 11.0 |
| 113 | 24.04 | 3.3 | 1.49700 | 81.5 | 11.0 | 11.0 |
| 114 | 48.70 | D3 72.95 ÷ 17.83 | | | 11.1 | 11.1 |
| 115 | −27.01 | 3.5 | 1.74950 | 34.8 | 10.4 | 10.4 |
| 116 | −17.64 | 1.5 | 1.53172 | 48.8 | 9.9 | 9.9 |
| 117 | −71.40 | 10.0 | | | 10.1 | 10.1 |
| 118 | Flat | 2.0 | 1.51680 | 64.2 | 10.2 | 10.2 |
| 119 | Flat | 22.5 | | | 10.2 | 10.2 |
| 120 | Flat | 34.0 | 1.51680 | 64.2 | 11.5 | 11.5 |
| 121 | Flat | 153.75 | | | 12.5 | 12.5 |

From left to right, the lines of the Table list the surface number, the radius of curvature, the distance to the next surface, the refractive index $n_d$, the dispersion $V_d$ and the optically effective diameters of the right and left beam path.

$n_d$ denotes the refractive index, $V_d=(n_d-1)/(n_F-n_C)$ is the Abbe coefficient. An air gap is identified by an empty line in the material details. The first and second microscopes 2R and 2L have variable distances D1, D2 and D3 in the beam path of the zoom system, so that different magnifications can be set.

As shown in Table 1, the sets of lenses 100 and 200 of the right-hand zoom system have a larger diameter than those of the left-hand zoom system, while the sets of lenses 300 and 400 are the same. In this "identical construction" of the microscopes according to Table 1 all the manufacturing parameters are identical apart from the diameters of the surfaces 101 to 111. This makes economic sense because of the possibility of longer production runs.

FIG. 8 and FIG. 9 show the beam path of the zoom system of the first microscope 2R at the maximum magnification and at the minimum magnification, respectively. FIG. 8 shows the maximum magnification. FIG. 9 shows the minimum magnification. The zoom system of the first and the second microscopes 2R and 2L is made up of a first lens group 100, a second lens group 200, a third lens group 300 and a fourth lens group 400. D1, D2 and D3 denote the variable distances between the lens groups 100, 200, 300 and 400. Between the first lens group 100 and the second lens group 200 at maximum magnification the distance prevailing D1=46.95 mm. Between the second lens group 200 and the third lens group 300 at maximum magnification the distance prevailing D2=10.19 mm. Between the third lens group 300 and the fourth lens group 400 at maximum magnification the distance prevailing D3=72.95 mm. At minimum magnification the composition of the distances is different. Between the first lens group 100 and the second lens group 200 at minimum magnification the distance prevailing D1 is 5.0 mm. Between the second lens group 200 and the third lens group 300 at minimum magnification the distance prevailing D2 is 107.26 mm. Between the third lens group 300 and the fourth lens group 400 at minimum magnification the distance prevailing D3 is 17.83 mm. Table 1 shows the radii of the surface numbers, as indicated in FIG. 8 and FIG. 9. The Table also shows that the optically effective diameters ø of the refracting elements of the first lens group 100 and of the second lens group 200 of the zoom system of the first microscope 2R are greater than the optically effective diameters ø of the refracting elements of the first lens group 100 and the second lens group 200 of the zoom system of the second microscope 2L. Both in the zoom system of the first microscope 2R and also in the zoom system of the second microscope 2L optical elements with flat surfaces such as a filter element and prism are provided before the formation of the image. The flat surfaces are designated by reference numerals 1118, 119, 120 and 121.

FIGS. 8 and 9 show as a continuous line the marginal beams which determine the diameter of the entry pupil and as broken lines the main beam for the maximum field angle. FIG. 9 shows that the main beam is at a significant spacing from the external diameter of the set 100, whereas in FIG. 8 the edge beams in the same group 100 run close to the external diameter. It is also plain that in the left-hand microscope 2L the diameter (18 mm) of the set 100 can be reduced without thereby blocking the main beam. This is a necessary condition to allow stereoscopic viewing up to the edge of the image. At the same time this condition that the main beam cannot be blocked up to the edge of the image in the microscope with the smaller diameter is a criterion for the design of zoom systems suitable for a stereomicroscope with different optically effective diameters. This condition thus constitutes an instruction for the positioning of the entry pupil for low magnifications.

In the embodiment according to FIG. 5 the observation angles of the right and the left microscopes 2R and 2L are symmetrical to the object plane 1. It is also conceivable to mount the microscope 7 in such a way that the angles of the optical axes 21R and 21L of the microscopes 2R and 2L to the perpendicular 12B are variable without changing the convergence angle 10. It is advantageous to have an angle less than half the convergence angle 10 for the microscope 2R with the larger optically effective diameter because of the lesser depth of field of this microscope (c.f. the remarks above). An arrangement of this kind is obtained from FIG. 5 by rotating the arrow in the object plane 1 together with the perpendicular 12B about the focal point 11 relative to the microscopes, particularly by clockwise rotation.

For documentation purposes the right-hand microscope 2R is preferably used due to the higher resolution. Arrangements of Greenough-style microscopes with documentation devices are well known. Adjustment of the angle of the optical axis 21R of the right-hand microscope 2R to the perpendicular 12B of close to zero degrees is particularly desirable for a documentation position in order to minimise the lack of definition of the edges at high resolutions. As can be seen from FIG. 10, in the beam path 20R of the first microscope 2R a decoupling device 55 is arranged. Thus the high resolution in the first beam path 20R is additionally made available to a documentation device 57. The documentation device 57 is a conventional CCD camera, for example.

As already mentioned, Greenough-style stereomicroscopes are equipped with an first and a second microscope 2R and 2L. To set the various magnifications, the first and second microscopes 2R, 2L are provided with an objective changer or a zoom system. The convergence angle 10 of the two microscopes 2R and 2L is retained in the typical range. The optical axes 21R and 21L of the two microscopes 2R and 2L may also continue to be arranged symmetrically to a perpendicular 12B arranged in the object plane 1, but this is not absolutely necessary. The first and the second microscopes 2R and 2B are according to the invention no longer made symmetrically regarding the maximum numerical aperture. It is advantageous if the maximum numerical aperture of the first microscope 2R is 10-50% greater than that of the second microscope 2L. The invention is particularly effective if the larger numerical aperture is greater than the sine of the convergence half-angle 10 of the two microscopes 2R, 2L which is a possibility if the numerical aperture of the second microscope 2L is smaller than the sine of the convergence half-angle 10. The objective changers or the zoom systems of the two microscopes 2R, 2L can be designed so that in the wide range of small microscope magnifications the numerical apertures of the two microscopes 2R and 2L are virtually identical, but for high magnifications are different.

In the case of the unsymmetrical numerical apertures the user receives two partial images with differing brightness, differing resolution and differing depth of field. It has been shown that a difference in brightness of up to 50% and the differences in the detail recognition do not adversely affect the merging of the two partial images into a 3-dimensional image. On the contrary, surprisingly the object is perceived 3-dimensionally with the resolution resulting from the higher numerical aperture and the greater depth of field resulting from the lower aperture. The invention is based on the utilisation of this physiological phenomenon for the design of stereomicroscopes.

The arrangement of the first and second microscopes 2R and 2L can be comprised various components provided that the magnification in the operated condition is the same. It is also possible for the first and second microscope 2R and 2L to be designed with an "identical construction", wherein, however, the optically effective diameter of at least one of the lens components is different. Similarly the first and second microscopes 2R and 2L can each be fitted with a diaphragm 31R or 31L, wherein the diaphragms 31R or 31L can be operated independently of one another to change their diameters. The operation of the diaphragms 31R or 31L can also be performed in such a way that in a first setting the ratio of the diaphragm openings in the first microscope 2R to the second microscope 2L is adjusted (diaphragm diameter in the first microscope 2R greater than in the second microscope 2L) and in a second setting or in other settings both openings of the diaphragms 21R or 31L are varied simultaneously with the ratio of the diaphragm surfaces remaining unchanged.

It is advantageous if a light filter 41R (e.g. neutral density stage or graduated filter) in the first beam path 20R of the first microscope 2R with the higher numerical aperture and if necessary insertion of an element 41L to compensate for any possible optical path difference in the second beam path 20L in order to reduce or eliminate differences in brightness resulting from the different numerical apertures nA. The filter 41R can be manually operated or varied in its position and hence filter strength by an operation controlled by the magnification selection without adversely affecting the resolution or the depth of field.

A further variant of the device can be arranged with a documentation port known per se (e.g. beam splitter or a decoupling device 55) in the beam path 20R of the first microscope 2R with the larger aperture, in order to make the high resolution of the documentation device 57 available. The documentation device 57 may be designed as film, video sensor, CCD, digital camera, and so on.

The strengths of the invention are in high power Greenough-style stereomicroscopes, where high magnifications and thus high resolutions are required. The effect of the invention is demonstrated on Greenough-style stereomicroscopes with a magnification ratio of Vmax/Vmin>5 or on zoom systems with zoom factors of z>5.

The invention claimed is:

1. A Greenough-type stereomicroscope comprising:
a first monocular microscope defining a first beam path and including a first magnification system defining a first optical axis, a first optical element having a first optically effective diameter, and a first observation unit disposed in the first beam path and configured to convey light of the first beam path forming a first partial image of a 3-dimensional image to a first eye of a user; and
a second monocular microscope defining a second beam path and including a second magnification system defining a second optical axis disposed at a convergence angle to the first optical axis, a second optical element corresponding to the first optical element and having a second optically effective diameter, and a second observation unit disposed in the second beam path and configured to convey light of the second beam path forming a second partial image of the 3-dimensional image to a second eye of the user,
wherein the first and second magnification systems are configured to produce an equal magnification with one another that is synchronously variable,
wherein the first optical element has a different optically effective diameter than the corresponding second optical element such that the first partial image and second partial image have different resolution and depth of field, and
wherein a first numerical aperture of the first microscope is greater than a sine of the convergence semi-angle.

2. The Greenough-type stereomicroscope as recited in claim 1, wherein the first optical element includes at least one of a lens element and a diaphragm.

3. The Greenough-type stereomicroscope as recited in claim 1, wherein a first numerical aperture of the first microscope is at least 10% greater than a second numerical aperture of the second microscope for at least one magnification setting or one magnification range of the first and second microscopes.

4. The Greenough-type stereomicroscope as recited in claim 3, wherein the first numerical aperture is 10% to 50% greater than the second numerical aperture.

5. The Greenough-type stereomicroscope as recited in claim 1, wherein a first numerical aperture of the first microscope is 10% greater than a second numerical aperture of the second microscope at a maximum magnification setting of the first microscope and the second microscope.

6. The Greenough-type stereomicroscope as recited in claim 5 wherein the first numerical aperture is 10% to 50% greater than the second numerical aperture.

7. The Greenough-type stereomicroscope as recited in claim 1, wherein a first optical axis of the first microscope and a second optical axis of the second microscope are arranged symmetrically to a perpendicular in an object plane of the stereomicroscope.

8. The Greenough-type stereomicroscope as recited in claim 1, wherein angles of the first optical axis and the second optical axis are arranged asymmetrically to a perpendicular in an object plane of the stereomicroscope.

9. The Greenough-type stereomicroscope as recited in claim 1, wherein the first and second microscopes are mounted such that respective angles between the first and second optical axes and a perpendicular in an object plane of the stereomicroscope are adjustable.

10. The Greenough-type stereomicroscope as recited in claim 9, wherein the angles between the first and second optical axes are adjustable while maintaining a constant convergence angle.

11. The Greenough-type stereomicroscope as recited in claim 1, wherein the first and second microscopes each include a zoom system configured for selecting the magnification.

12. The Greenough-type stereomicroscope as recited in claim 1, further comprising at least one filter configured to be positioned in the first beam path and wherein the first microscope has a higher numerical aperture.

13. The Greenough-type stereomicroscope as recited in claim 12, wherein the at least one filter is a graduated filter.

14. The Greenough-type stereomicroscope as recited in claim 13, wherein the positioning of the at least one filter is performed manually.

15. The Greenough-type stereomicroscope as recited in claim 14, wherein the first and second optically effective diameters are variable in a fixed relationship to one other.

16. The Greenough-type stereomicroscope as recited in claim 13, wherein the positioning of the at least one filter is controlled by a selecting the magnification.

17. The Greenough-type stereomicroscope as recited in claim 1, further comprising a decoupling device disposed in the first beam path and wherein the first microscope has a higher numerical aperture, the decoupling device configured to direct light at least partially from the first beam path to a documentation device.

18. The Greenough-type stereomicroscope as recited in claim 1, wherein the first and second optical elements include respective first and second diaphragms and wherein the first optically effective diameter is greater than the second optically effective diameter.

19. The Greenough-type stereomicroscope as recited in claim 18, wherein the first and second optically effective diameters are variable independently of one other.

* * * * *